United States Patent

Ziegler et al.

[11] Patent Number: 5,887,596
[45] Date of Patent: Mar. 30, 1999

[54] VEHICLE ASHTRAY

[75] Inventors: Christiane Ziegler, Waldachtal; Roland Dettling; Bernd Schenk, both of Horb; Ulrich Nienhaus, Hagold-Hockdorf, all of Germany

[73] Assignee: fischerwerke, Artur Fischer GmbH & Co. KG., Waldachtal, Germany

[21] Appl. No.: 929,206

[22] Filed: Sep. 9, 1997

[30] Foreign Application Priority Data

Sep. 9, 1996 [DE] Germany ............ 196 36 528.7

[51] Int. Cl.⁶ ...................................... A24F 19/00
[52] U.S. Cl. .................. 131/231; 131/240.1; 131/242; 206/246; 296/37.9
[58] Field of Search ............ 131/231, 242, 131/240.1; 206/246; 296/37.9

[56] References Cited

U.S. PATENT DOCUMENTS 2,590,043  3/1952  Rundell ............................. 131/241
5,144,963  9/1992  Dabringhaus et al. .............. 131/231

FOREIGN PATENT DOCUMENTS

| GM 19 88 401 | 5/1968 | Germany . |
| 2 105 0 32 | 8/1972 | Germany . |
| 3310658A1 | 9/1984 | Germany . |
| 3040203C2 | 8/1985 | Germany . |
| 36 14 804 A1 | 11/1987 | Germany . |
| 39 39 498 A1 | 6/1991 | Germany . |
| 2 209 656 A | 5/1989 | United Kingdom . |

Primary Examiner—Stanley S. Silverman
Assistant Examiner—Steven B. Leavitt
Attorney, Agent, or Firm—Michael J. Striker

[57] ABSTRACT

A vehicle ashtray has a housing fastenable to a vehicle, an ashtray drawer movable under the action of a spring force from a close basic position to an open end position, and a stop member arranged so that said ashtray drawer remains in a half-open position and is movable to said open end position only after overcoming a resistance.

9 Claims, 4 Drawing Sheets

VEHICLE ASHTRAY

BACKGROUND OF THE INVENTION

The present invention relates to a vehicle ashtray.

Vehicle ashtrays are known, for example, from DE 30 40 203 A1 and DE 33 10 658 A1. Both ashtrays are transversely installed vehicle ashtrays with a drawer which can be removed from a housing for emptying. The ashtray according to DE 30 40 203 A1 is designed so that improved protection of the dashboard and at the same time good accessibility of the ashtray, even with the ash container only partly pulled out, is obtained. The ashtray according to DE 33 10 658 A1 is specifically an ashtray principally for the rear wall of the back rest of a vehicle seat having additional elements in the form of handles, coat hooks, drinking cup holders or the like.

When an ashtray is installed in the region of the dashboard, there is relatively little room available for the ashtray. On the other hand, with the ashtray pulled out, there should still be access to units lying below the ashtray for operation of the same.

SUMMARY OF THE INVENTION

Accordingly, it is an object of the present invention to provide a vehicle ashtray, which avoids the disadvantages of the prior art.

More particularly, it is an object of the present invention to provide a vehicle ashtray which, even in the open position, allows access to controls arranged below the ashtray and improves the mode of operation compared with known vehicle ashtrays.

The vehicle ashtray constructed according to the invention is accordingly provided with a stop member, so that the ashtray drawer remains in a half-open position and is movable into the open end position only after overcoming a resistance.

This enables the ashtray to be installed both in the transverse and in the longitudinal direction, since in the half-open position the controls of the vehicle arranged below the ashtray are still accessible. After overcoming the resistance, movement into the open end position is effected, in which, for example, an ash receptacle arranged in the ashtray drawer can be removed for emptying.

According to a preferred construction, the stop member is formed by two spring elements arranged parallel, each of which has an angled stop face, arranged facing each other, for a stop projection mounted on the ashtray drawer and movable between the spring elements. On continued movement of the ashtray drawer from the half-open position, the spring elements are pressed outwards by the stop projection and the way is thus cleared for the ashtray drawer.

Advantageously the stop projection runs in a recess of the housing and the spring elements are joined in one piece to a frame, which has two oppositely disposed archway-like bent portions which permit passage of the stop projection.

This construction enables the stop projection to be guided and locked in a space-saving manner in the half-open and fully opened position. Moreover, release thereof by overcoming a resistance is rendered possible in an elegant manner.

According to a further preferred construction, the ash collecting region in the ashtray drawer, for example, an ashtray insert, is illuminated in both the half-open and in the open position.

The illumination is advantageously effected by means of a light guide. Expediently in a further construction a double light guide fixedly connected to the housing is provided, which terminates in the direction in which the ashtray drawer is pulled out at two different points in order to illuminate the ashtray drawer in the half-open and the open position. In both positions of the ashtray drawer an illumination that is not susceptible to faults is effected.

In order to exploit the ashtray drawer yet further on the basis of the small amount of space required, according to a further preferred construction a flap is located on the end face of the ashtray drawer, behind which there is arranged a coin-holder.

The overall construction and the arrangement of the ashtray drawer in the housing are therefore operationally reliable and space-saving. The rectangular ash receptacle in the form of an ashtray is preferably arranged in the ashtray drawer so as to be longitudinally slidable. The movement of the ashtray drawer is advantageously effected by means of a coiled spring, so that here too movement of the ashtray drawer out of the housing is ensured in a space-saving and operationally reliable manner.

The invention therefore provides a solution for a vehicle ashtray that is adapted to practicalities and is inexpensive, combed with the added facility of a coin holder.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
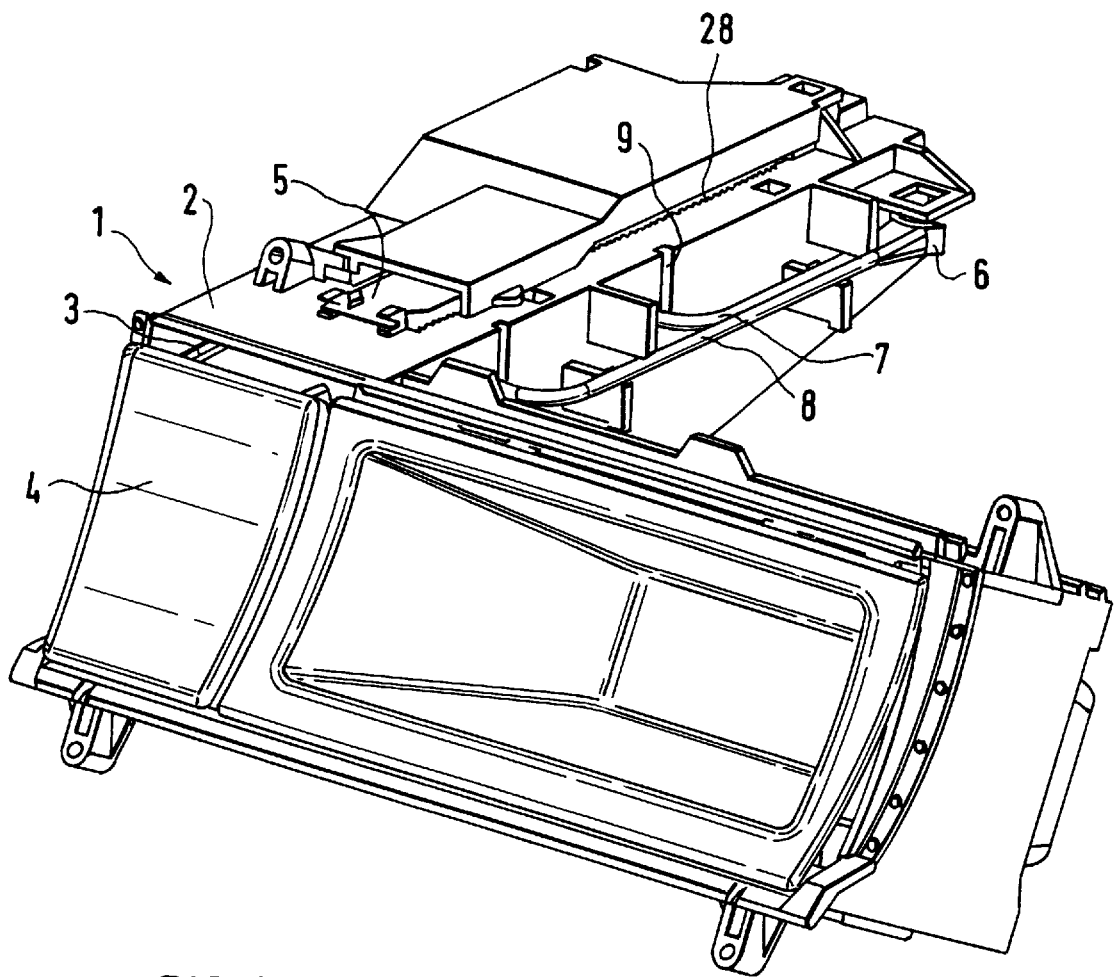
FIG. 1 is a perspective view of a vehicle ashtray in combination with a storage compartment, with the ashtray closed.

A vehicle ashtray 1 illustrated in FIG. 1 has a housing 2 with an ashtray drawer 3 movable therein. By pressure on a flap 4 of the ashtray drawer 3, the ashtray drawer moves by virtue of a built-in push-push mechanism and a coiled spring 5 out of the closed position. Parallel to the housing 2 there is arranged a double light guide 6 fixedly connected to the housing. It consists of a relatively short and a relatively long angled light guide 7 and 8 respectively. The light guides 7, 8 reach the ashtray drawer 3 via slots 9 arranged in the housing. The shorter light guide 7 illuminates the ashtray drawer 3 in the half-open position and the longer light guide illuminates it in the open position.

Figure 2:
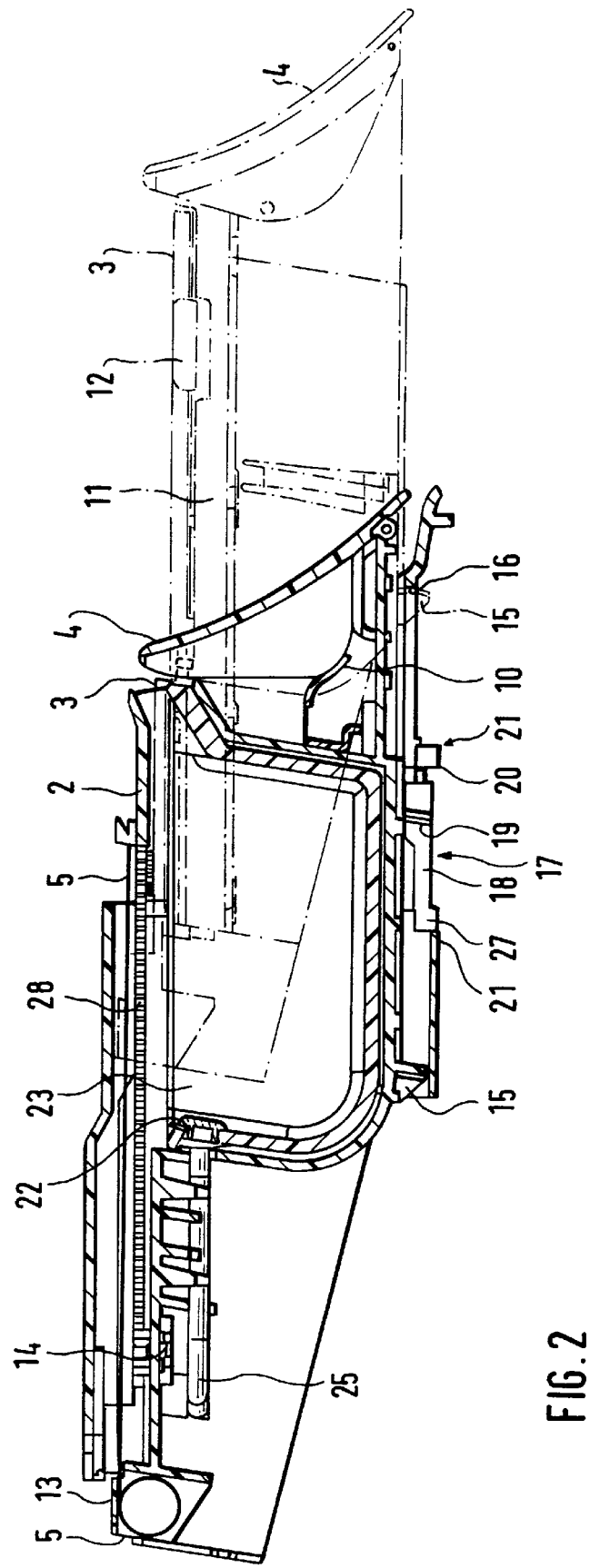
FIG. 2 is a side view of the vehicle ashtray in section with the vehicle ashtray in a closed and a fully open position.

FIG. 2 illustrates the ashtray drawer in section, in the basic position with solid lines and in the open position with broken lines. It also shows the closed flap 4 with a coin holder 10 arranged behind it. In the drawer there is a removable ash receptacle 11, which is removable for the purpose of emptying only in the completely open state, however. On each side of the ash receptacle 11 there is an indentation 12. It is used firstly to take out the ash receptacle 11 and also for pulling the ashtray drawer 3, for the purpose of overcoming the resistance, from the half-open to the open position. FIG. 2 shows also the coiled spring 5 which is arranged in a protective housing 13. For damping, a rotary damper 14 which engages in a rack 28 is mounted on the ashtray drawer 3.

A step projection 15 is located beneath the ashtray drawer and in the opened position strikes against a transversely running stop edge 16 on the housing 2. Moreover, a stop member 17 for the half-open position is located on the underside of the housing 2. This stop member consists of two parallel spring elements 18 having angled stop faces 19 facing one another. The spring elements 18 are joined in one piece with a metal frame 20 which has two archway-like bent portions 21 for the passage of the stop projection 15 on its path from the closed position into the opened position.

As also shown in FIG. 2 a window 22 is arranged at the rear wall of the ash receptacle 11. Light is supplied through the window by way of the light guides and is able to reach the ash chamber 23 through a light guide 25.

Figure 3:
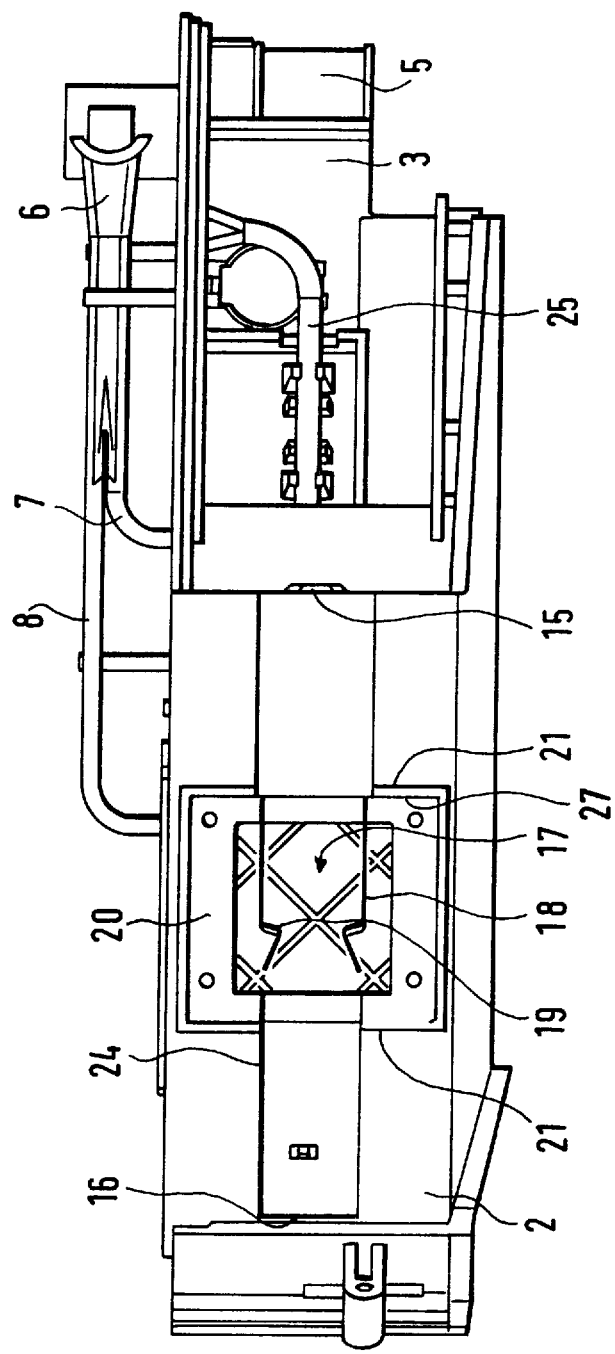
FIG. 3 is a view showing an underside of the vehicle ashtray.

The view of the vehicle ashtray 1 from below as shown in FIG. 3 illustrates the stop member 417 for the half-open position explained in conjunction with FIG. 2. The stop projection 15 moves in an elongate recess 24 of the housing 2 and through the first bent portion 21 as far as the stop faces 19 of the spring element 18. Because of a pulling movement on the ashtray drawer, the spring elements 18 spread apart, as soon as the resistance formed by them is overcome. The ashtray drawer consequently moves under the action of the coiled spring 5 into the open position. As this happens, the stop projection 15 moves beneath the second archway-like bent portion 21 and continues in a recess 24 as far as the stop edge 16. This Figure also shows the frame 20, which is joined in one piece with the spring elements 18 by side walls 27 of the archway-like bent portions 21.

The connection between the window 22 and the light guides 7 and 8 respectively is made in the half-open position and open position respectively via a light guide 25 arranged in the ashtray drawer 3.

Figure 4:
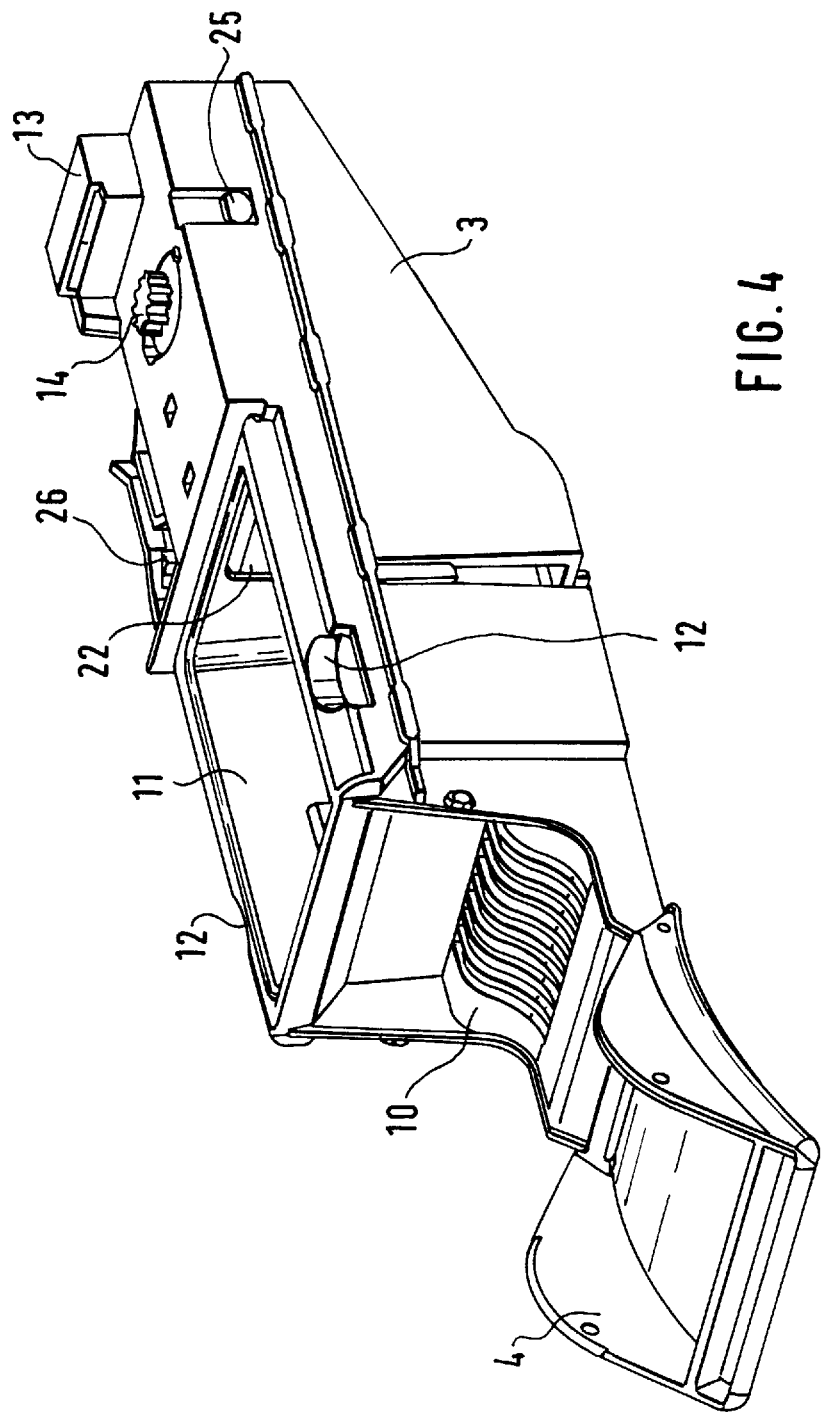
FIG. 4 is a view showing the vehicle ashtray with an opened coin holder.

FIG. 4 shows a perspective view of the ashtray drawer 3 with the flap 4 opened and the coin holder 10 disposed behind it. In the ashtray drawer 3 there is a removable ash receptacle 11 with the above-mentioned indentations 12. The window 22 arranged in the rear wall of the ash receptacle 11 is connected to the light guide 25. The protective housing 13 serves to accommodate the coiled spring which, as shown in FIG. 1, is connected to the housing 2. The rotary damper 14 already mentioned and also a heart-shaped cam 26 for the known push-push mechanism are disposed on the ashtray drawer 3.

Both the ashtray drawer 3 and the housing 2 are made of plastics material.

It will be understood that each of the elements described above, or two or more together, may also find a useful application in other types of constructions differing from the types described above.

While the invention has been illustrated and described as embodied in vehicle ashtray, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vehicle ashtray, comprising a housing adapted to be arranged in a vehicle; an ashtray drawer which is guided in said housing so as to be withdrawable from said housing; a spring which displaces said ashtray drawer from a closed basic position in which said ashtray drawer is located in said housing to an open end position in which said ashtray drawer extends outwardly of said housing; releasable locking means for holding said ashtray drawer against a force of said spring in said closed basic position; an overcomeable stop member against which said spring displaces said ashtray drawer during movement from said closed basic position in direction toward said open end position, said stop member holding said ashtray drawer against the force of said spring in a half-open intermediate position in which said ashtray drawer is located between said closed basic position and said open end position, so that said ashtray drawer after overcoming of said stop member is displaceable further from said half-open intermediate position to said open end position.

2. A vehicle ashtray as defined in claim 1, wherein said stop member is formed by two spring elements arranged on said housing parallel and provided with angled stop faces which face each other, said ashtray drawer having a stop projection cooperating with said stop faces and movable between said spring elements.

3. A vehicle ashtray as defined in claim 2, wherein said housing has a recess in which said stop projection runs; and further comprising a frame joined with said spring elements to form a one-piece structure, said frame having two oppositely disposed archway-like bent portions permitting a passage of said stop projection, said spring elements projecting into said frame being connected to sidewalls of said band portions.

4. A vehicle ashtray as defined in claim 1, wherein said ashtray drawer has an ash receptacle located in said ashtray drawer; and further comprising means for illuminating said ash receptacle in said ashtray drawer in both said half-open end position and in said open end position.

5. A vehicle ashtray as defined in claim 4, wherein said illuminating means include light guide means.

6. A vehicle ashtray as defined in claim 5, wherein said light guide means include a double light guide which is connected to said housing and in direction in which said ashtray drawer is pulled out, terminates at two different points operative for illumination of said ashtray drawer in said half-open position and in said open end positions.

7. A vehicle ashtray as defined in claim 1, wherein said ashtray drawer has a front end face; and further comprising a flap located on said front end face of said ashtray drawer; and a coin-holder arranged behind said flap.

8. A vehicle ashtray as defined in claim 1, wherein said ashtray drawer has a rectangular ash receptacle which is longitudinally slidable into said housing.

9. A vehicle ashtray as defined in claim 1; and further comprising a coil spring arranged on said housing to move said ashtray drawer.

\* \* \* \* \*